G. HUYSMANS.
ANTIVIBRATION DEVICE FOR VEHICLES OF ANY KIND.
APPLICATION FILED DEC. 23, 1908.

928,520.

Patented July 20, 1909.

Witnesses:
Waldo M. Chapin
James D'Antonio

Inventor,
Georges Huysmans.
by Rosenbaum & Stockbridge
Attys.

UNITED STATES PATENT OFFICE.

GEORGES HUYSMANS, OF BRUSSELS, BELGIUM.

ANTIVIBRATION DEVICE FOR VEHICLES OF ANY KIND.

No. 928,520.          Specification of Letters Patent.          Patented July 20, 1909.

Application filed December 23, 1908. Serial No. 468,887.

*To all whom it may concern:*

Be it known that I, GEORGES HUYSMANS, a subject of the Belgian King, and residing at Brussels, Belgium, have invented new and useful Improvements in Antivibration Devices for Vehicles of any Kind; and I do hereby declare the following to be a full, clear, and exact description of the same.

My present invention relates to anti-vibration devices for vehicles, such as motor cars, autobuses, tramway- and railway-cars, and it has for its object to provide an improved device of this class, comprising strips or layers of india rubber or similar material, inserted between the body and supporting frame and containing suitable recesses formed therein to constitute closed air-chambers, for the purpose of compensating jerks and shocks, giving the vehicle great suppleness and avoiding any noise, said strips or layers being secured to the frame and body by special means, fully described anl claimed hereinafter and shown in the accompanying drawings, wherein:—

Figure 1:
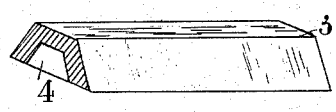
Figure 2:
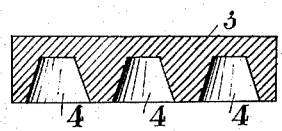
Figure 3:
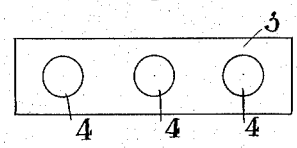
Figure 4:
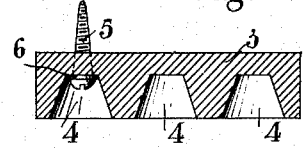
Figure 5:
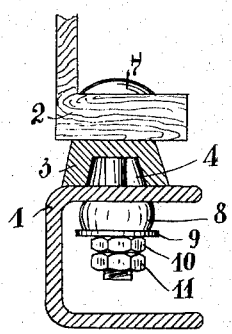
Figure 6:
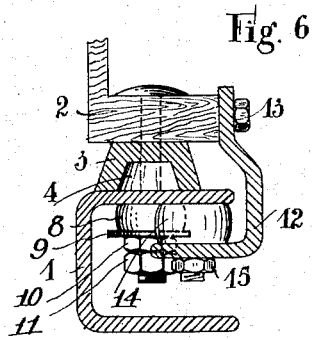

Figures 1, 2 and 3 show perspective, sectional and top views of a portion of an antivibration strip. Fig. 4 illustrates the means for connecting the strips to the car-body. Fig. 5 shows the means for connecting the car-body, strip and frame. Fig. 6 shows an elevation of the safety-connection, and Fig. 7 illustrates a modified form and arrangement of the device.

Referring to Figs. 1 to 6 of this drawing, 1 represents the frame of a car (motor car), 2 the wooden part of the car-body and 3 is a strip or layer of yielding material, such as india rubber, inserted between the frame and body. Said strip 3 is provided on its lower face with a series of recesses 4 of any suitable form, which form air-chambers. The strips 3 are arranged upon the frame 1, so that the weight of the vehicle causes the openings of said recesses 4 to be tightly closed, whereby the air contained in the recesses 4 is strongly compressed, say to several atmospheres, by the action of the pressure upon the strip 3. It will be readily understood that this arrangement results in the formation of air-cushions capable of compensating any jerks, shocks and vibrations of the frame 1.

The form, size and suppleness of the material used for the manufacture of the strips 3 are changed according to the weight of the vehicle to which said strips are applied. The strips 3 are preferably connected to the car-body 2 by means of metal screws 5 (Fig. 4), extending through the bottom of the recesses 4 preferably lined with a metal washer 6. The car-body 2 is then connected to the frame 1 by means of screw-bolts 7 (Fig. 5), extending through the body 2, the strip 3 and the frame 1. The lower end of said bolt is fitted with a washer of india rubber or suitable spring 8, intended to provide a yielding connection and compensate reactions. The bolts 7 are held in place by means of metal washers 9, nuts 10 and lock-nuts 11. The body 2 may be furthermore provided with a safety connection or fastener 12 (Fig. 6), intended to compensate the reaction if it becomes too violent and reinforce the resistance of the bolts 7. Said fasteners 12 are secured to the car-body 2 by means of screws 13 and provided at their base-portion with washers 14 made of yielding material, preferably india rubber and held in place by means of a suitable bolt 15.

Figure 7:
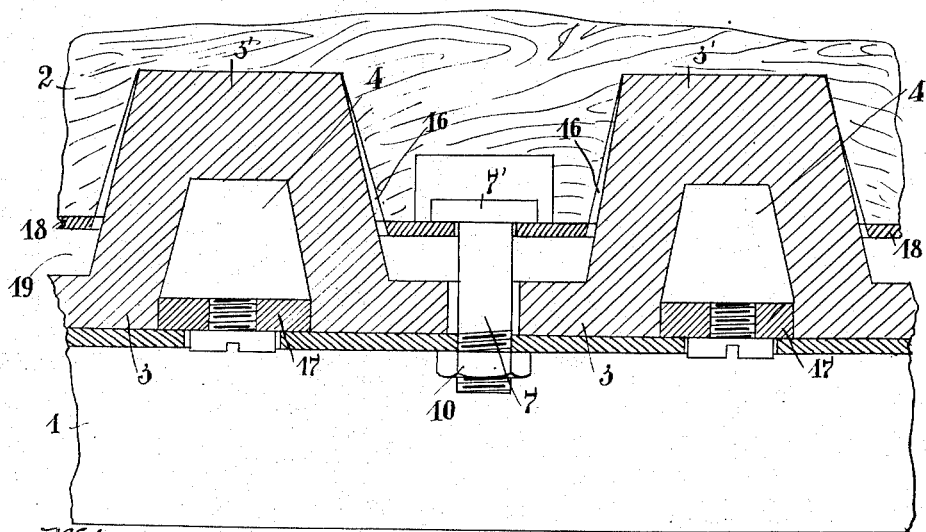

In the modified form shown in Fig. 7, the strip 3 is provided at its upper face with cone-shaped projections 3', arranged in suitable recesses 16, provided in the lower part of the body 2 and permitting of the free compression of said projections 3'. Each of the latter contains a recess 4, forming an air-chamber and closed by metal or other disk 17, so that the pressure acting upon the projections 3' results in a strong compression of the air inclosed in said recesses 4.

In order to compensate the weakening of the lower part of the body 2 by the recesses 16, the base of said body is preferably reinforced by means of a sheet 18 of steel, aluminum or other metal, provided with holes to clear the passage of the projections 3'.

The strip 3 is held against lateral displacements by means of bolts 7, the heads 7' of which are arranged in suitable recesses provided in the body 2 above the sheet 18. Said bolts 7 extend through the strip 3 and frame 1, and are secured in place by nuts 10. By this arrangement, the body 2 is connected with the frame 1 as well as the anti-vibrating part 3.

Arranged between the strip 3 and the lower end of the body 2 is a free space 19, intended to leave the play which is necessary for the compression of the projections 3', and whereby the body 2 does not come into contact with the flat portions of the strip 3, unless jerks or shocks occur which cannot be completely absorbed by the projections 3'.

It is manifest that the devices herein described and shown may be used advantageously for compensating jerks and shocks in stationary engines, machine-tools, and any other machines and apparatus, in connon-carriages, ammunition wagons and generally where the use of anti-vibration devices may give good results by compensating or deadening vibrations, jerks, shocks and noise.

Having fully described my invention, what I claim and desire to secure by Letters Patent is:—

1. In anti-vibration devices of the class described, the combination with the body of a car and the under-frame thereof, of a strip of yielding material such as india rubber inserted between said body and frame, air-chambers formed in said strip and open at the bottom, said strip being placed upon the frame so that the compression of the yielding material closes the air-chambers and compresses the air therein, and means for connecting said strip body and frame, substantially as set forth.

2. In anti-vibration devices of the class described, the combination with the body of a car and the under-frame thereof, of a strip of yielding material such as india rubber inserted between said body and frame, air-chambers formed in said strip and open at the bottom, said strip being placed upon the frame so that the compression of the yielding material closes the air-chambers and compresses the air therein, screw-bolts extending through said frame, strip and body, screw-nuts on the lower ends of said bolts, and washers of yielding material between said nuts and the frame, substantially as set forth.

3. In anti-vibration devices of the class described, the combination with the body of a car and the under-frame thereof, of a strip of yielding material such as india rubber inserted between said body and frame, air-chambers formed in said strip and open at the bottom, said strip being placed upon the frame, so that the compression of the yielding material closes the air-chambers and compresses the air therein, screw-bolts extending through said frame, strip and body, screw-nuts on the lower ends of said bolts, and washers of yielding material between said nuts and the frame, a metal angle-piece secured to the lower end of the body and the frame, and a washer of yielding material between said angle-piece and the frame, substantially as set forth.

In testimony whereof I have signed my name to this specification in the presence of two subscribing witnesses.

GEORGES HUYSMANS.

Witnesses:
 CHARLES HONOLD,
 GREGORY PHELAN.